Sept. 25, 1945.  G. C. WARD  2,385,557
LIGHT VISOR
Filed Aug. 10, 1940
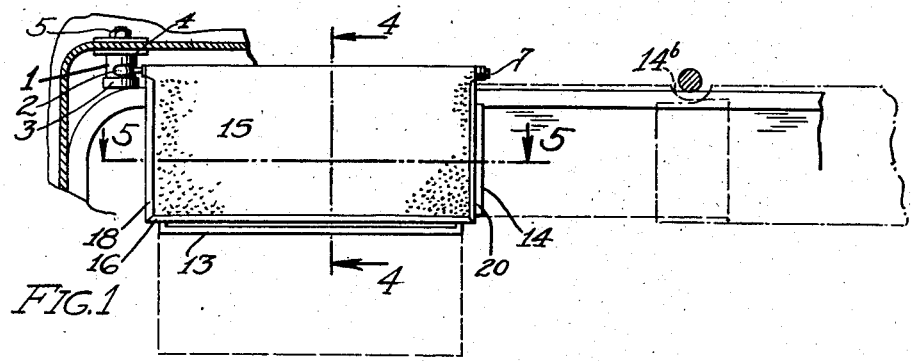
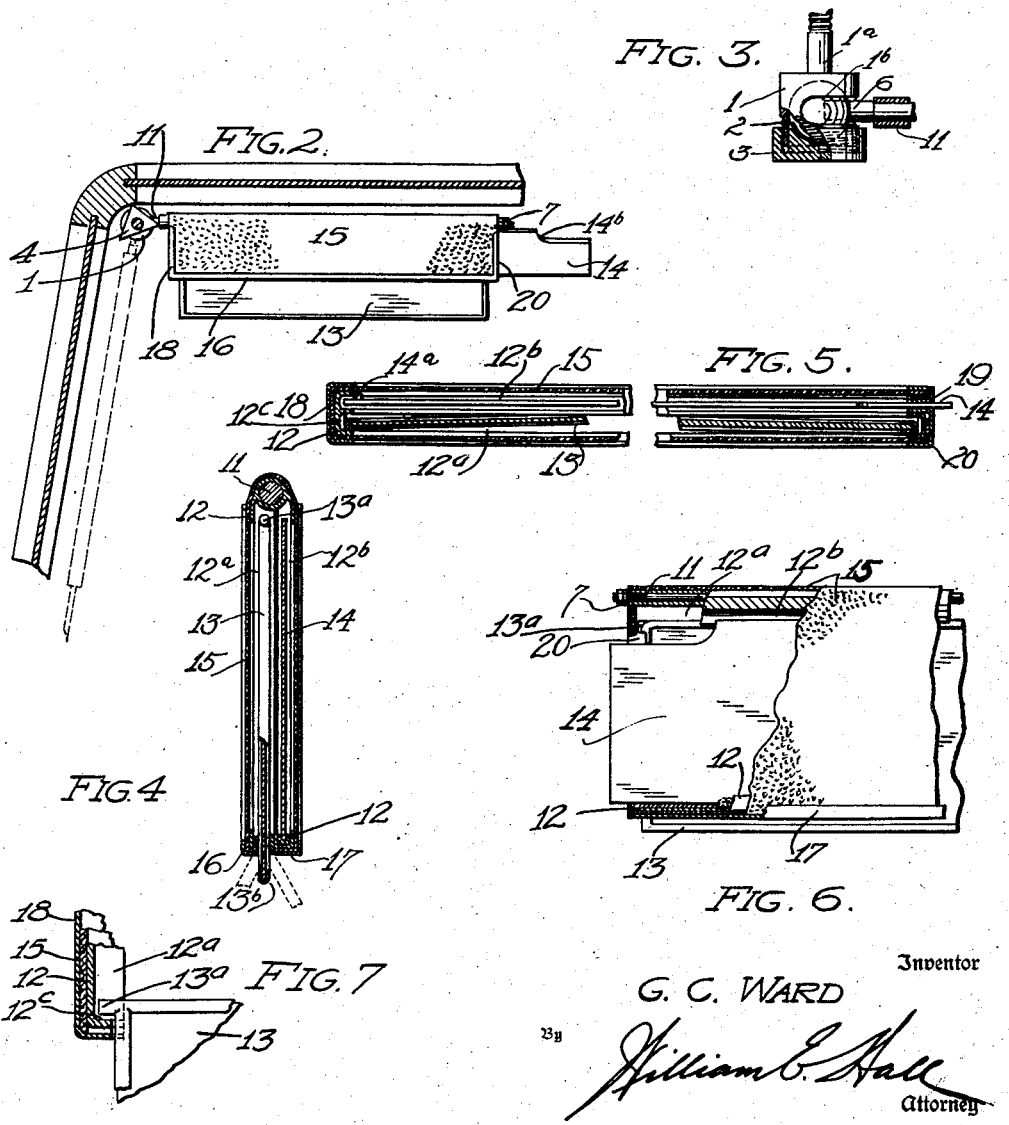
Inventor
G. C. WARD
By
*William E. Hall*
Attorney Patented Sept. 25, 1945

2,385,557

UNITED STATES PATENT OFFICE 2,385,557

LIGHT VISOR

George Chester Ward, Ventura, Calif.

Application August 10, 1940, Serial No. 352,094

2 Claims. (Cl. 296—97)

My invention relates to a light visor particularly adapted for automobiles.

One of the principal objects of this invention is to provide a light visor which is compact and which may be shifted or folded out of the way when not in use, but which may be readily folded into position and extended or enlarged as desired.

A more specific object of this invention is the provision of a visor of this class which, when in its normal light shielding position, may be readily extended laterally at the front or at the side of the vehicle, and further to provide one, which, when laterally extended, is constructed to clear or fit around objects at the front of the vehicle or in front of the windshield thereof.

Another object of this invention is to provide a visor of this class which may be translucent or opaque, but which is provided with a transparent panel, capable of being withdrawn to any desired extent from or beyond the lower edge of the upper portion of the visor so that the driver or observer of the vehicle on which the visor is installed may have a light-protected field of vision, but whereby he is shielded from the principal portion of the light rays.

An object also of this invention is to provide a visor of this class which may be shifted to the front or to the side of the vehicle, and which may be extended laterally or vertically when in either of the above or in any intermediate position.

A further object of this invention is to provide a visor of this class which has a transparent withdrawable panel, and which, when withdrawn, may be pivoted with respect to the main portion of the visor.

With these and other objects in view, as will appear hereinafter, I have devised a light visor having certain novel features of construction, combination, and arrangement of parts and portions, as will be hereinafter described in detail and particularly set forth in the appended claims, reference being had to the accompanying drawing, and to the characters of reference thereon, which form a part of this application, in which:

Fig. 1 is a fragmentary view in elevation, showing the forward portion of the top and side of the passenger compartment of an automobile, and showing my light visor in one form, provided therein and shifted to a downward or light-shielding position, and showing by dotted lines the movable panels drawn to their extended positions, and also showing by dot and dash lines the withdrawn position of a panel of an adjacent visor;

Fig. 2 is a fragmentary view in plan thereof, but showing the panels, partly withdrawn, in solid line positions, and showing by dotted lines the visor shifted to the side of the passenger compartment to shield light from the side of the automobile;

Fig. 3 is an enlarged elevational view of the universal mounting for my visor, showing portions thereof broken away and in section to facilitate the illustration;

Fig. 4 is a transverse sectional view thereof, taken through 4—4 of Fig. 1;

Fig. 5 is a fragmentary longitudinal sectional view thereof, taken through 5—5 of Fig. 1, both Figures 4 and 5 being shown on an enlarged scale, and the thickness being considerably exaggerated in order to facilitate the illustrations;

Fig. 6 is a slightly enlarged view, taken from the normally front side and free end of the visor, and showing portions thereof broken away and in section to facilitate the illustration; and, Fig. 7 is an enlarged fragmentary view of one corner of the visor, showing a stop at one end of the upper portion of the transparent panel, about which the panel may be pivoted when withdrawn.

Light visors are in common use today, and they are normally supported at one corner on a suitable support provided at the upper left hand corner of the top of the automobile. My visor, which is substantially of the same shape, namely, rectangular and flat or elongated, is also supported at one corner in a similar manner. The supporting means shown consists of a ball socket 1, in which is mounted a ball 2, which is secured in position by a cap 3. The ball socket 1 has an axial shank 1ª which extends through a plate 4 and is secured in position by a nut 5 within the top of the automobile. A supporting rod 6 is secured in one side of the ball 2 and extends therefrom through a transverse slot 1ᵇ in the side of the ball socket 1, said slot extending for more than 90°. The slot 1ᵇ is wider than the diameter of the rod 6 so that the rod may be moved slightly up or down, as well as transversely through the slot.

On the rod 6 is swivelly mounted a tube 11 which supports at one side a frame 12. The tube of the frame is held in position on the rod 6 by means of nuts 7 at the edge of the frame opposite the supporting means.

The tube 11 is positioned at one long edge of the frame 12, which is rectangular in shape, and, when the visor is in use, the frame 12 depends from the tube. This frame 12 is skeleton in form and is provided with two recesses or pockets 12a and 12b, the former being open at the long edge of the visor opposite the tube, and the latter being open at the end opposite the supported end of the visor. In these pockets are removably placed the panels 13 and 14, as will be described hereafter. The frame is enclosed preferably by a suitable casing which may be a fabric material 15. This fabric material is drawn around the tube 11 and is secured in place at the lower edge of the frame 12, that is, the edge opposite the tube 11, by means of long clips 16 and 17, both being of U-shaped cross-section. These clips secure the edges of the fabric covering around the edges of the frame. The lateral edges of the covering are also secured in position over the edges of the frame by long clips 18, 19, and 20, all of said clips being of U-shaped cross-section.

The panel 13 is preferably made of a flexible colored transparent material which is encased in a metallic frame 13b. The frame 13b is preferably curved longitudinally so that the end edges of the frame 13b engage one side of the wall of the pocket 12a, and the intermediate portion of the frame 13b engages the opposite wall of the pocket. Thus the panel 13 is frictionally held in the withdrawn position, and therefore may be withdrawn to any desired extent and held in such position.

It will be here noted that when the visor itself, or the casing thereof which contains the two panels 13 and 14, is in a depending normal light shielding position, the casing of the visor shields the driver or passengers from direct rays of light, but when the transparent panel 13b is withdrawn, the driver or passengers may have a clear field of vision below the casing or opaque portion of the visor.

Beyond the opposite ends of the panel 13, adjacent the upper edge thereof, are provided stops 13a which form trunnions. These stops or trunnions engage shoulders 12c at the opposite sides of the lower portion of the pocket 12a to prevent withdrawal of the panel 13. When the stops or trunnions engage the shoulders 12c, the panel 13 may be shifted or rocked in opposite directions and assume angular positions, as shown by dotted lines in Fig. 4.

The panel 14 may be made of similar material, but is preferably fabricated as an opaque panel, such as fiber. This panel which is normally housed in the pocket 12b, may be of substantially the length of the main portion of the visor, and may be withdrawn substantially its full length from the end of the casing. The inner end of the panel may have a stop 14a to prevent complete withdrawal.

This panel 14 is intended to shield the front of the automobile at least to the center. In mounting of the visor, the upper portion is usually above other fixtures provided above the windshield of the automobile. Such fixture or fixtures are usually one or more rear-view mirrors. These fixtures or the mountings thereof would interfere with the complete withdrawal of the panel 14. For this reason, I have provided a cut-out portion 14b at the upper edge of the panel near the end so that the panel 14 may be withdrawn and clear such fixtures, as shown.

The whole visor may be shifted to the side of the automobile, as indicated by dotted lines in Fig. 2. When so shifted, the panels 14 and 15 may also be withdrawn, as indicated above.

It will be here noted that although the panel 15, when swung forwardly about its pivotal support 1, is positioned backwardly from the windshield, but will be referred to as being in front of the same.

Though I have shown and described a particular construction, combination, and arrangement of parts and portions, I do not wish to be limited to the same, but desire to include in the scope of my invention the construction, combination, and arrangement substantially as set forth in the appended claims.

I claim:

1. A light visor for vehicles, comprising a flat casing having a pocket therein with an opening at one edge, and a panel removably positioned in the pocket and withdrawable from said opening, the casing having shoulders at the ends of the opening, the normally inner edge of the panel having trunnions, for engaging said shoulders when the panel is withdrawn, providing means for pivoting the panel with respect to the casing.

2. A light visor for vehicles, comprising a flat casing having a pocket with an opening at one edge, and a transparent panel frictionally retained in said pocket and withdrawable from said opening, said casing having bearings at the ends of the opening, and the panel having trunnions at the ends of the inner edge for engaging the bearings to provide means for pivoting the panel with respect to the casing.

GEORGE CHESTER WARD.